United States Patent [19]

Göldner

[11] 4,165,899
[45] Aug. 28, 1979

[54] VEHICLE SEAT

[75] Inventor: Walther Göldner, Ebersbach, Fed. Rep. of Germany

[73] Assignee: Recaro GmbH & Co., Kirchheim, Fed. Rep. of Germany

[21] Appl. No.: 908,833

[22] Filed: May 23, 1978

[30] Foreign Application Priority Data

Jun. 22, 1977 [DE] Fed. Rep. of Germany ....... 2727948

[51] Int. Cl.$^2$ .............................................. B60N 1/02
[52] U.S. Cl. .................... 297/361; 297/284; 297/355; 297/408; 297/456
[58] Field of Search ............. 297/284, 355, 361, 376, 297/384, 396, 408, 454–456, 460, DIG. 9

[56] References Cited

U.S. PATENT DOCUMENTS

| | | | |
|---|---|---|---|
| 2,812,802 | 11/1957 | Gielow | 297/408 X |
| 2,828,810 | 4/1958 | Barecri et al. | 297/396 |
| 4,007,962 | 2/1977 | Muller-Deisig | 297/408 X |

FOREIGN PATENT DOCUMENTS 2356982  5/1975  Fed. Rep. of Germany .

*Primary Examiner*—James C. Mitchell
*Attorney, Agent, or Firm*—Wigman & Cohen

[57] ABSTRACT

A vehicle seat having a back rest and a shoulder support pivotally connected thereto is disclosed. The back rest and shoulder support are formed as upholstery support shells with the shoulder support pivotably mounted to the upper portion of the back rest. The shoulder support shell has a bottom portion inclined forwardly from the back rest shell from the pivotal connection thereto and is provided with top and side edges which overlap the top and side edges of the back rest shell. An adjusting and setting mechanism is provided for rotating and setting the shoulder support in a selected rotational position relative to the back rest. The shoulder support also includes mounting elements for a head rest.

6 Claims, 3 Drawing Figures

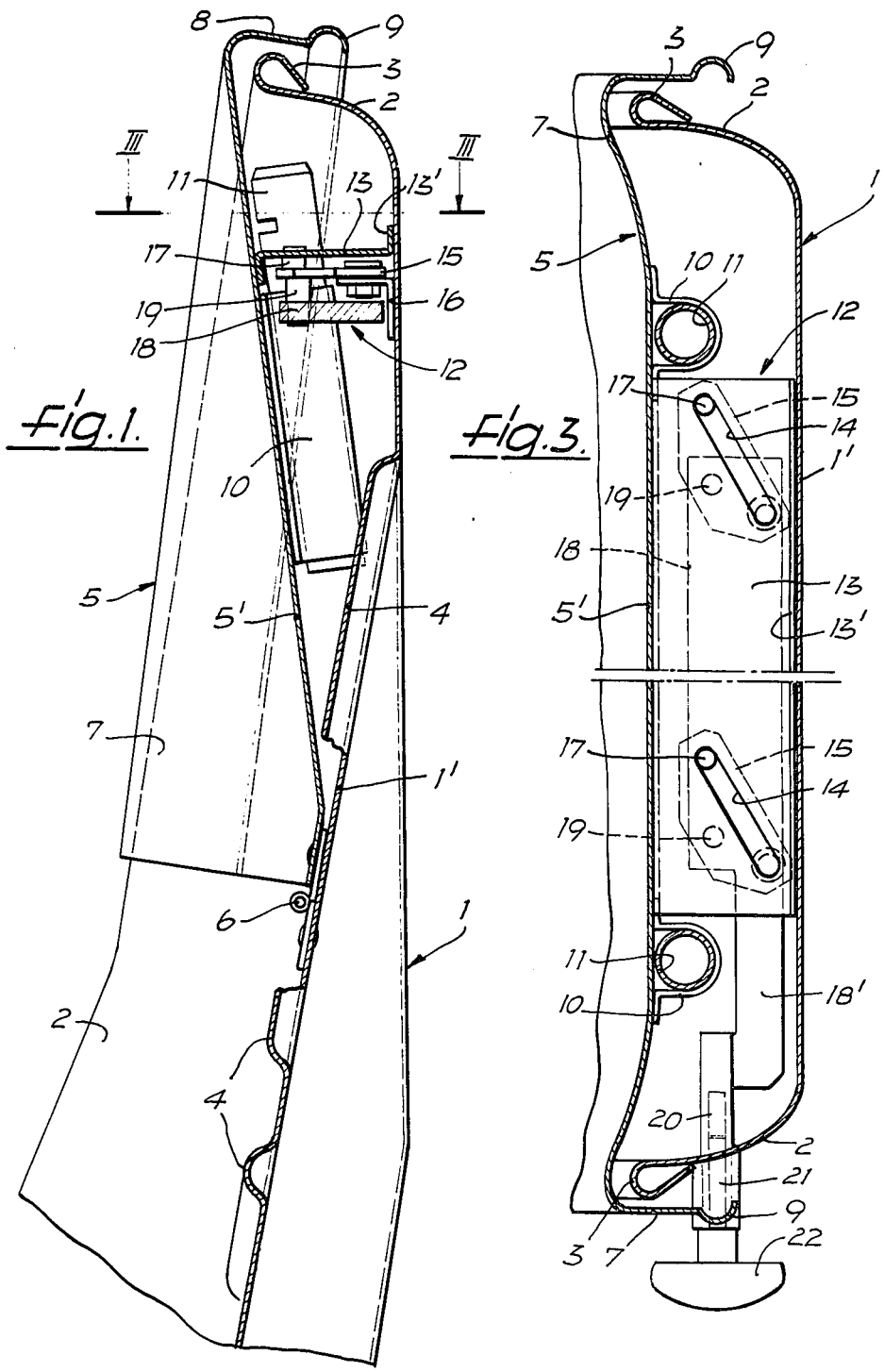

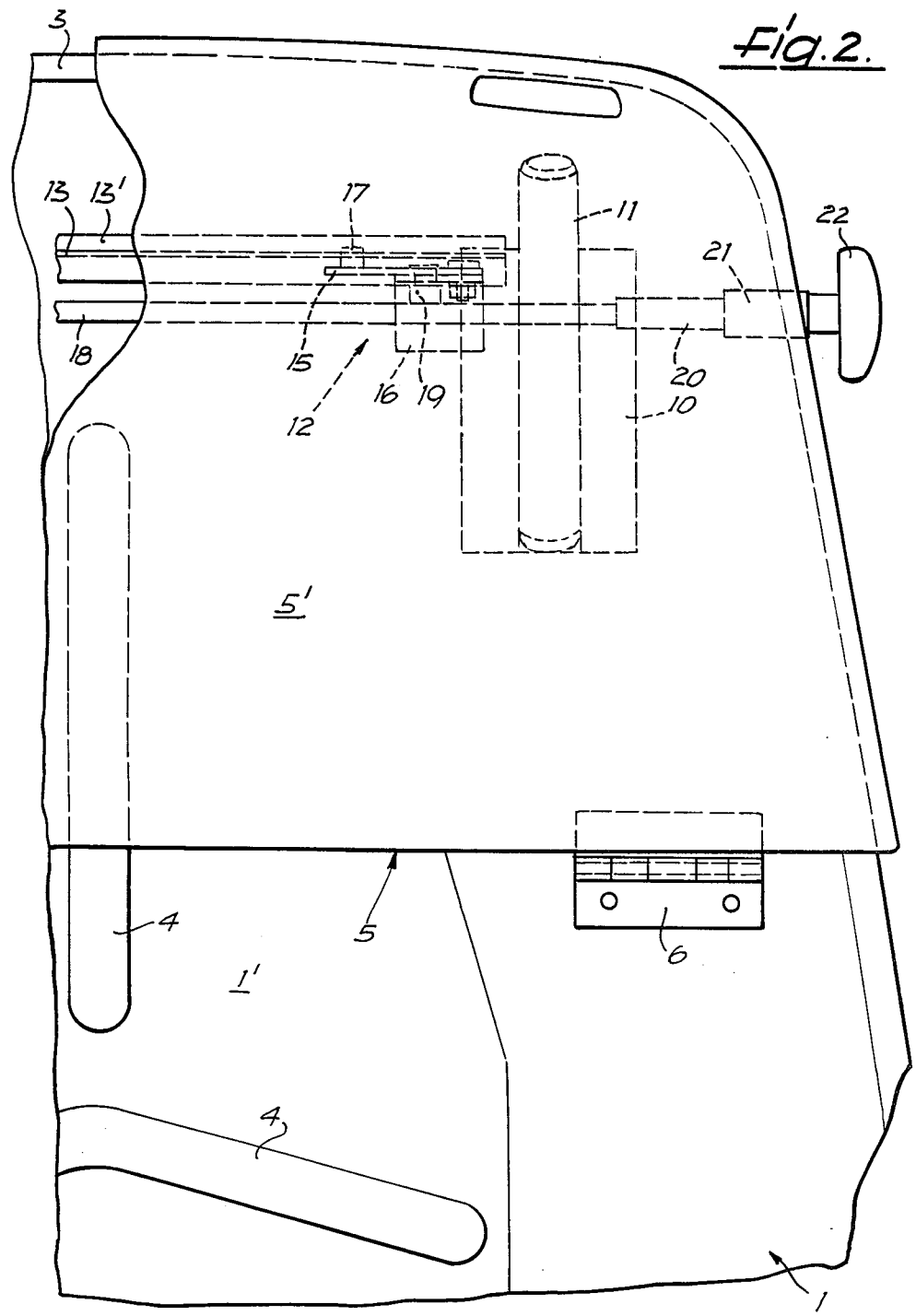

VEHICLE SEAT

BACKGROUND OF THE INVENTION

The present invention relates to a vehicle seat with a shell as a support for the upholstery of the back rest and an upholstery support for a shoulder support arranged forwardly of the shell in the upper half of the back rest. The shoulder support is pivotably connected with the shell at the lower edge of the support and is adapted to be set in a desired rotational position by means of an adjusting and setting mechanism. The shoulder support also supports a holding device for a head rest.

In a known vehicle seat of this general type, for example, as disclosed in German Pat. No. DT-OS 2,356,982, the upholstery support of the head rest is formed as a plate which terminates at a distance from the side edges formed by the upholstery support of the back rest. In this manner, not only is a good support for the shoulder region achieved, but by means of an adjustment of the shoulder support, the cross profile or shape of the back rest can also be changed, which, in many cases, is desirable. The pivotal range of the shoulder support, however, must be kept relatively small in order to avoid a step-like formation in the cross-sectional profile of the back rest.

SUMMARY AND OBJECTS OF THE INVENTION

A primary objective of the invention is to provide a vehicle seat with a shoulder support which makes possible a greater pivotal range of the shoulder support, yet is still formed in a simple manner. This objective is accomplished in a vehicle seat of the aforementioned type according to the present invention in that the upholstery support of the shoulder support is formed as a second shell which overlaps the upper edge and the adjacent side edges of the first shell. By means of this type of upholstery support for the shoulder support, as with the known seat, a continuous piece of upholstery and a continuous upholstery cover can be used. This is advantageous both for manufacturing reasons as well as for providing a uniform or smooth appearance of the seat. Because the edge of the second shell overlaps the edge of the first shell, safety requirements can also easily be met. The solution according to the invention is also especially advantageous to the extent that the first shell, which forms the upholstery support of the back rest, need not be modified or at least not substantially modified as compared to a shell having no shoulder support. The load capacity of the first shell is, therefore, not limited by the shoulder support.

In a preferred embodiment, the distance of the bottom of the second shell from the bottom of the first shell increases as it approaches the upper edge. In the vicinity of the upper edge of the first shell, this distance is at least equally as deep as the upper edge of the first shell. This provides a simple means for providing a sufficiently large space for the head support holder and the adjusting and setting mechanism between the two shells.

The adjusting and setting mechanism, which preferably allows a form-fitted force transfer or shifting of the second shell in both pivotal directions thereof, has, in one preferred embodiment, at least one pivot arm pivotable about an axis extending in the longitudinal direction of the back rest. The pivot arm is hinged on the first shell in the area to the rear of the second shell and is coupled with the second shell by means of a slot-pin connection. This embodiment of the adjusting and setting mechanism is simple and, therefore, cost-saving, yet reliable. In addition, by means of the shape of the slot, an automatic arresting means or stop can be provided for the adjusting and setting mechanism without additional expense, so that no additional stop or arresting elements are necessary for this purpose.

Preferably, a plate is provided which is attached to the rear side of the second shell parallel to the pivotal axis of the second shell and substantially perpendicular thereto. This plate is provided with two slots extending parallel to each other and arranged substantially symmetrical with respect to the longitudinal centerline of the two shells. The slots extend diagonally across the plate between the shells and form, together with a respective pin of a pivot arm engaging therein, two similar slot-pin connections. The preferably bent edge of this plate, which confronts the first shell, can form a stop for limiting the pivotal range of the second shell toward the first shell.

When two pivotal arms are provided, which, in view of the torsion-resistant support of the second shell, is advantageous, a connecting rod or a connecting strap is hinged to each of the pivotal arms at an equal distance from the axis of rotation of the arm. From one end of the arm, a threaded rod extends toward an operating member, which threaded rod engages in a threaded bore of such member, the latter being formed as a handwheel. The operating member is mounted so as to be rotatable, but not axially movable in a side edge of the second shell. Both the expense and the required space for this type of adjusting and setting mechanism are minimal.

BRIEF DESCRIPTION OF THE DRAWINGS

In the following, the invention is described in greater detail with the aid of an exemplary embodiment shown in the drawings, wherein:

FIG. 1 is a broken longitudinal section through the back rest of an exemplary embodiment of the invention, shown without upholstery;

FIG. 2 is a broken front view of the upper portion of the back rest of the exemplary embodiment, also shown without upholstery; and FIG. 3 is a cross-section taken along the line III—III of FIG. 1.

DETAILED DESCRIPTION OF A PREFERRED EMBODIMENT

A back rest of a vehicle seat has a first shell 1 as an upholstery support, which consists, in a known manner, of sheet steel or reinforced plastic, and has a forwardly directed edge 2 both on the sides as well as on the upper portion thereof. The edge 2 includes, as shown in FIG. 1, a bead 3, which is provided for safety reasons, and which is formed in the exemplary embodiment by an outwardly, reverse-wrapped edge strip. Reinforcing seams 4 in the bottom 1' of the first shell 1 stiffen the shell.

Approximately the upper third of the first shell 1 is covered by a second shell 5 arranged forwardly of the first shell, which second shell is also formed of sheet steel or reinforced plastic. The second shell 5 is connected with the first shell by means of hinges 6 pivotable about an axis running across the back rest, at the lower edge of said second shell 5. When the back rest is pivotably connected with the seat element, as is usual, the pivot axis of the second shell is parallel to this pivotal axis.

As FIG. 1 shows, the distance of the bottom 5' of the second shell 5 increases from the bottom 1' of the first shell 1 to its upper edge to the extent that the bottom 5' lies at a spacing forwardly of the upper edge of the first shell 1. A projecting side edge 7 joins the bottom 5' on both longitudinal sides thereof, which edge 7 extends at a spaced distance from the inner side of the edge 2 of the first shell 1 up to the height of the bead 3, and is then curved outwardly, overlapping the bead 3, so as to cover a portion of the outside of the edge 2 by means of a second or outer side portion of the edge 7. The projecting edge 7 thus overlaps the edge 2 without coming into contact therewith. The depth dimension of the outwardly lying side portions of the edge 7 is uniform and is substantially equal to the depth dimension of the edge 8 along the upper portion of the bottom 5'. The edge 8 extends rearwardly from the bottom 5' and forms the continuation of the outer side portions of the side edge 7 of the second shell 5. The distance of the bottom 5' from the bottom 1' of the first shell 1, increases as it approaches the upper edge of the first shell 1 and the depth of the inner side portions of the side edge 7 of the second shell 5 decreases from the lower end of the second shell to the upper end of the bottom 5' to zero, as best seen in FIG. 1. The free edge zone of the outwardly lying side portions of the side edge 7 and of the upper edge 8 form an inwardly open seam 9, which seam could also be a bead or the like. The depth of the edge 8 is chosen in such a manner that the seam 9 is confronting the bead 3 when the second shell 5 is pivoted forwardly to the greatest possible angle, i.e., counterclockwise as seen in FIG. 1.

Upholstery (not shown) covers the bottom 5' of the second shell 5, the bottom 1' of the first shell 1, to the extent the bottom 1' is not covered by the second shell 5, the exposed portions of the edge 2 of the first shell 1 and the edges 7 and 8 of the second shell 5 in a manner common with back rests using a shell as an upholstery support. An elastic covering material (not shown) covers the upholstery and is also drawn over the exposed portion of the edge 2 and the edges 7 and 8. The back rest, therefore, only differs from the known back rests having a shell as an upholstery support, with regard to its outer appearance, in that there is a rearwardly open cleft or crevice between the edges 7 and 8 of the second shell and the edge 12 of the first shell in the upper portion of said back rest.

The second shell 5 serves as a shoulder support which has an adjustable inclination angle. It also serves as the support for a head rest so that, during a rotation of the shoulder support, the head rest is also rotated in the same direction by the same angle. Holders for a head rest are, therefore, attached to the rear side of the second shell 5 by means of connecting straps 10. In the exemplary embodiment, the holders comprise two guide tubes 11, each for receiving a rod-like support of a head rest. Not particularly illustrated detention means, which engage in a cross slit of the guide tube 11, permit a height adjustment of the holder. Two bores (not shown) in the upper edge 8 of the second shell 5 aligned with the guide tube 11, as well as grooves in the bead 3 that are also aligned with a respective guide tube 11, permit the introduction of the holder into the guide tubes 11.

In order to be able to pivot the second shell 5 relative to the first shell 1 and set same in a selected rotational position, an adjusting and setting mechanism 12 is provided. In the upper half of the second shell 5, a rectangular plate 13 is attached to the rear side of the bottom 5', which plate lies parallel to the rotational axis of the second shell and substantially perpendicular to the bottom 5'. The plate 13 extends toward the bottom 1' of the first shell 1 and is bent along the edge confronting the bottom 1' to form a stop 13'. This stop defines one of the end positions of the pivotal range of the second shell 5. As shown especially in FIG. 3, the plate 13, which lies between the two guide tubes 11, is provided with two straight, parallel slots 14, which are arranged symmetrically with respect to the longitudinal center line of the second shell, and which define an acute angle with the two longitudinal sides of the plate 13 abutting at the bottom 5' of the second shell and at the bottom 1' of the first shell, which angle is about 45° in the exemplary embodiment.

At a small spacing beneath each end section of the plate 13, adjacent the slots 14 and parallel thereto, a plate-like pivot arm 15 is arranged. The two pivot arms 15 are each pivotably mounted about an axis extending vertical to the plate 13 at an angle piece 16 attached to the bottom 1' of the first shell 1. A pin 17 extends upwardly from the end section opposite the pivot point on the two similarly formed pivot arms 15, which pins 17 engage in a respective superposed slot 14 of the plate 13, and are slidable in such respective slot. In the pivotal position of the second shell 5 shown in FIG. 1, the pins 17 are located at one end of the associated slot 14. If the pivot arms 15 are rotated counterclockwise, as seen in FIG. 3, the pins 17 urge the plate 13 away from the bottom 1' of the first shell 1 and thereby travel toward the other end of the associated slot. This shifting of the plate 13 results in a forced forward rotational movement of the second shell 5. Because of the form-fitting force transfer, the second shell is also forcibly rotated when the pivot arm 15 is rotated in the opposite direction.

The two pivot arms 15 are connected to each other by means of a drive rod 18, which is arranged at a small spacing beneath the pivot arms, and which, in the exemplary embodiment, is shaped as a flat strap. The coupling is accomplished by means of rotatable pins 19, each of which is connected with a pivot arm 15 at a distance from the rotational axis thereof and which engages in a bore of the drive rod 18. The drive rod 18, in the exemplary embodiment, has a bracket-like end section 18', which surrounds one of the guide tubes 11 and supports a threaded rod 20 welded to its free end. The rod 20 lies in the plane of the drive rod 18 and parallel to its longitudinal axis. The threaded rod 20 engages in an axial threaded bore of a sleeve 21, which is mounted in the edge 2 of the first shell 1 so as to be rotatable but not axially movable, and which supports a handwheel 22 on its end projecting out of the shell.

A rotation of the handwheel 22 in one direction or the other results in a shifting of the drive rod 18 transverse to the second shell 5 and relative thereto. When the drive rod 18 is moved in this manner, the two pivot arms 15 are rotated in the corresponding direction, whereby the second shell 5 is rotated away from or toward the first shell 1. Because of the automatic arresting means of the threaded connection between the threaded rod 20 and the sleeve 21, the slot-pin connection need not be formed in an automatically arresting manner. An automatic arresting of the slot-pin connection could, however, also be provided, or in a different embodiment of the adjusting mechanism, could set the shoulder support in a selected rotational position.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. In a vehicle seat having a first shell providing a support for the upholstery of a back rest and a shoulder support having a lower edge and arranged forwardly of the first shell in an upper portion of the back rest, said shoulder support being pivotally connected to the first shell about an axis at said lower edge, said shoulder support supporting a holding device for a head rest and means for adjusting and setting the shoulder support in a desired rotational position about said axis, the improvement comprising said first shell having an upper edge and side edges, said shoulder support comprising a second shell overlapping the upper and side edges of the first shell adjacent thereto.

2. The improvement according to claim 1, wherein said first shell includes a first bottom and said second shell includes a second bottom, the spacing between the second bottom and the first bottom increasing from the rotational axis of the shoulder support toward the upper edge of the first shell, said spacing at said upper edge being at least equal to the depth of said upper edge.

3. The improvement according to claim 1, wherein said adjusting and setting means comprises at least one pivot arm hingedly connected to said first shell rearwardly of the second shell for pivotable movement about an axis parallel to the longitudinal axis of the back rest, and a slot-pin connection for operatively connecting said pivot arm to the second shell.

4. The improvement according to claim 3, including a plate affixed to said second shell at the rear side thereof and parallel to the rotational axis of the second shell, said slot-pin connection including a pair of parallel slots in said plate arranged substantially symmetrically with respect to the longitudinal axis of the back rest, the longitudinal axes of said slots extending at an angle relative to said shells, said connection further including pins mounted to a respective pivot arm and engaging in a respective slot.

5. The improvement according to claim 4, wherein said plate has an edge confronting the first shell, said edge defining a stop for limiting the pivotal movement of the second shell toward the first shell.

6. The improvement according to claim 4, including a connecting rod hingedly mounted to both pivot arms at substantially equal distances from the axes of rotation of said arms, said connecting rod having threaded free end, an activating member rotatably mounted in a side edge of the first shell and having a threaded bore for threadably engaging the threaded free end of the connecting rod.

* * * * *